(12) United States Patent
Davis et al.

(10) Patent No.: US 6,501,419 B2
(45) Date of Patent: Dec. 31, 2002

(54) SENSOR SYSTEM AND METHOD FOR DETERMINING YAW ORIENTATION OF A SATELLITE

(75) Inventors: John E. Davis, Claremont, CA (US); Henry H. Liao, Seattle, WA (US)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 09/824,190

(22) Filed: Apr. 2, 2001

(65) Prior Publication Data
US 2002/0140606 A1 Oct. 3, 2002

(51) Int. Cl.[7] .............................................. H04B 7/185
(52) U.S. Cl. ....................................... 342/352; 342/442
(58) Field of Search ................................. 342/352, 442

(56) References Cited

U.S. PATENT DOCUMENTS

| 4,062,509 A | 12/1977 | Muhfelder et al. |
| 4,489,383 A | 12/1984 | Schmidt, Jr. |
| 5,101,356 A | * 3/1992 | Timothy et al. |
| 5,161,051 A | 11/1992 | Whitney et al. |
| 5,308,024 A | 5/1994 | Stetson, Jr. |
| 5,319,968 A | 6/1994 | Billing-Ross et al. |
| 5,319,969 A | 6/1994 | Billing-Ross et al. |
| 5,546,309 A | 8/1996 | Johnson et al. |
| 5,837,894 A | 11/1998 | Fritz et al. |
| 6,018,315 A | 1/2000 | Ince et al. |

* cited by examiner

Primary Examiner—Theodore M. Blum
(74) Attorney, Agent, or Firm—Alston & Bird LLP

(57) ABSTRACT

A first pair of antennas are mounted on a satellite spaced along a first axis and a second pair of antennas are spaced along a second axis for receiving signals from another satellite in orbit with the satellite, the first and second axes being orthogonal to a yaw axis that points toward the centroid of the celestial body about which the satellite orbits. Each pair of antennas are used to derive phase angle and signal strength differences, and these differences are used for deducing a yaw orientation of the satellite about the yaw axis.

27 Claims, 3 Drawing Sheets

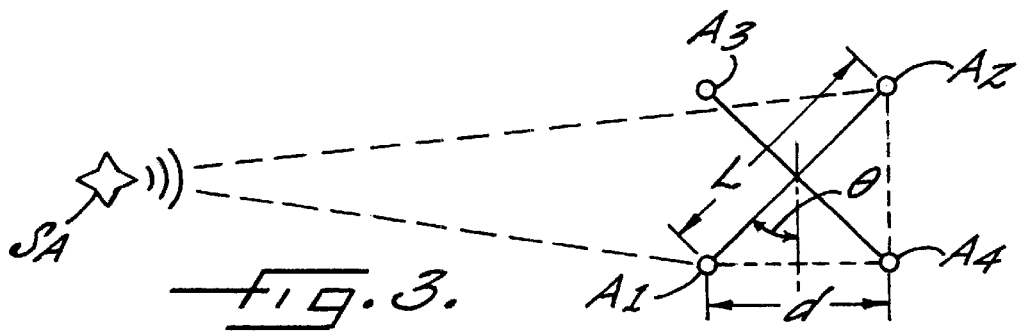
_fig. 3._
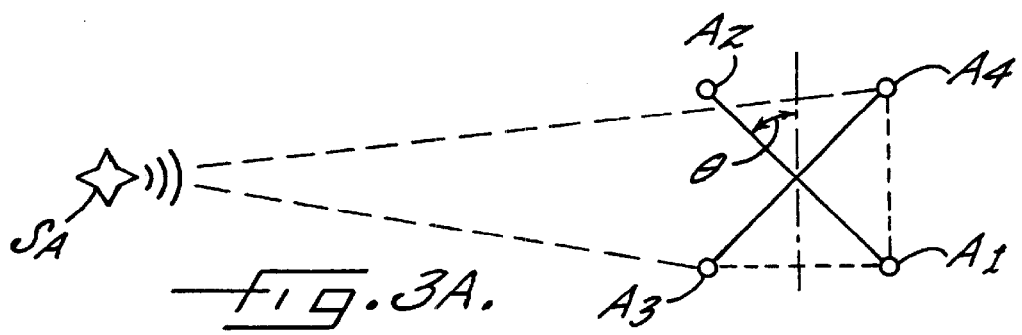
_fig. 3A._
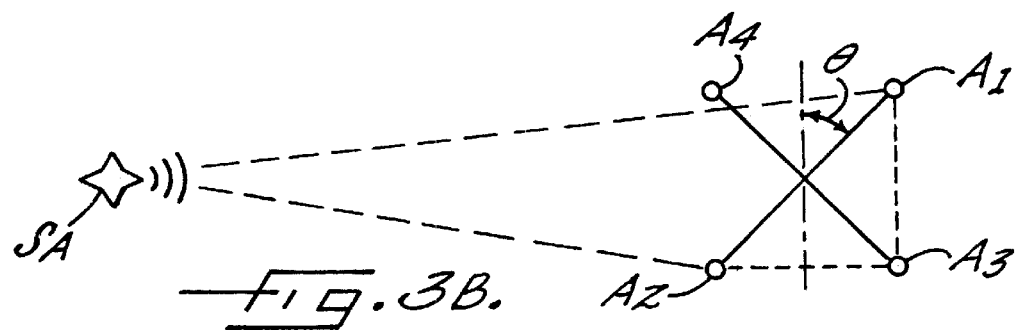
_fig. 3B._
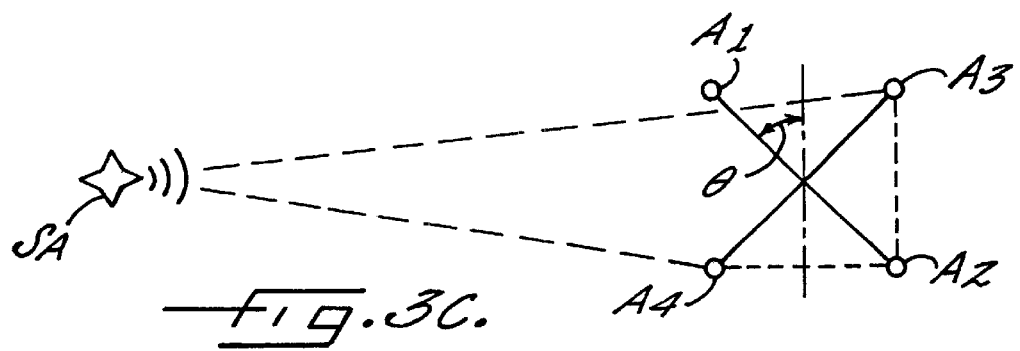
_fig. 3C._

SENSOR SYSTEM AND METHOD FOR DETERMINING YAW ORIENTATION OF A SATELLITE

FIELD OF THE INVENTION

The present invention relates to sensor systems and methods for determining the orientation of a satellite in orbit about earth or other celestial body. The invention relates more particularly to sensor systems and methods for determining the yaw orientation of a yaw-steered satellite about an axis pointing toward the center of the earth or other celestial body.

BACKGROUND OF THE INVENTION

Optical sensors for satellites have been developed for viewing earth in order to derive position information of the satellite relative to earth. In such schemes, it is known to direct light from a field of view of the sensor onto a focal plane array, such as a charge coupled device (CCD), comprising a grid of pixels. The field of view and the optics of the sensor are typically designed such that at least part, and more typically all, of the circumference of the earth's limb (i.e., the transition region between the earth and space) can be imaged onto the focal plane when the sensor is pointed in a suitable direction relative to the earth. The relative location of the image of the earth limb on the focal plane is determined by finding the pixels at which a large gradient in intensity of the incident light energy is located, a large gradient indicating a transition between earth and space. Using an appropriate algorithm, it is possible to determine the rotational orientation of the sensor, and hence of the satellite, about two orthogonal axes based on the locations of the transition pixels of the focal plane array. See, for example, U.S. Pat. No. 6,026,337.

A number of patents for various types of optical sensors have been acquired by the assignee of the present application, including U.S. Pat. Nos. 5,502,309, 5,534,697, 5,627,675, and 5,841,589, the entire disclosures of which are hereby incorporated herein by reference. The sensors described in all of the aforementioned patents have a single field of view for looking at the limb of the earth. As a rule, a sensor seeing the circular limb of the earth can be used for deriving position information about two axes, but cannot be relied upon for providing position information about the third axis. For example, if the sensor is looking along an axis that passes through the centroid of the earth, then any rotation of the sensor about that axis will not change the image of the earth limb on the focal plane array. This situation is not unlikely in many cases. For instance, some types of satellites are intentionally rotated about a yaw axis that is directed along the nadir vector through the centroid of the earth. As an example, yaw-steered satellites such as GPS satellites are deliberately yawed in order to position the solar panels of the satellite in an optimum position for receiving the sun's radiation. If the optical sensor is mounted on the satellite so as to be looking along the yaw axis, then it is not possible for the sensor to provide information about the rotational position of the satellite about the yaw axis.

For this reason, on satellites using a limb-looking optical sensor as described above, it is necessary to derive the position information about the third axis by other means. One way to do this is to detect another celestial body with the sensor, such as stars or the sun. This solution, however, is not entirely satisfactory. A star sensor requires an elaborate star map, and is generally not very accurate. A sun sensor only works when the sun is within view, such that another method for determining yaw orientation is required whenever the sun disappears behind the earth, or when the sun is in a location displaced a substantial amount from an orthogonal to the yaw axis.

U.S. Pat. No. 6,018,315 discloses a method and system for determining yaw orientation of a satellite using signals received from a global positioning system (GPS) satellite. A pair of spaced antennas are mounted on the satellite whose yaw orientation is to be deduced, and signals from the GPS satellite are received by both antennas and sum and difference signals are generated based on phase differences between the signals received by the antennas. The yaw angle of the subject satellite is correlated with the sum and difference signals such that yaw angle can be deduced from these signals.

One problem with using a method employing two antennas such as that of the '315 patent is that the yaw angle solution can be multiple-valued. That is, the same sum and difference signals can be generated for two or more different yaw angles. For instance, if the pair of antennas is rotated about the yaw axis by 180 degrees, then each antenna will occupy the position previously occupied by the other antenna, and hence the same sum and difference signals will be generated by the antenna pair. This is not generally a problem if continuous tracking of the yaw orientation is performed, because the orientation of the satellite will be clear based on the previous yaw orientation history and the current sum and difference signals. However, if a computer upset should occur such that the yaw orientation must be established without benefit of knowledge of the previous yaw orientation history, then the multiple-valued nature of the yaw solution based on the sum and difference signals may make it impossible to deduce with certainty the yaw orientation of the satellite based solely on the sum and difference signals.

SUMMARY OF THE INVENTION

The present invention addresses the above needs by providing a method and apparatus for determining the yaw orientation of a satellite in which two (or more) separate pieces of information are generated for any given yaw orientation, and the combination of the two pieces of information is unique for each yaw orientation, thus avoiding the multiple-value problem. This is accomplished in accordance with the invention by providing two (or more) pairs of antennas. A first pair is spaced apart on the satellite along a first axis, such as the roll axis of the satellite. A second pair is spaced apart on the satellite along a second axis, such as the pitch axis of the satellite. Of course, the first and second axes can be oriented in any arbitrary sense relative to the satellite body axes as long as the orientation of the axes is known relative to the body axes, and as long as neither pair is aligned along the yaw axis. Each antenna pair is used to generate a difference signal by comparing the signals arriving at the two antennas. Orientation of the satellite about the yaw axis is deduced based on both difference signals.

In one embodiment of the invention, the difference signal derived for one antenna pair represents a phase angle difference between the signals arriving at the two antennas. The difference signal for the other antenna pair represents a signal strength difference derived by comparing the strengths of the signals arriving at the two antennas. In a preferred embodiment, each pair of antennas is used to derive both a phase angle difference and a signal strength difference. Using both the phase and signal strength difference, it is possible to deduce the yaw orientation of the satellite even when there has been a computer upset causing the yaw orientation history to be lost.

For example, if the first pair of antennas is aligned along a direction perpendicular to the direction along which a signal is arriving from the other satellite when such a computer upset occurs, it would be impossible to determine the correct yaw orientation based solely on the zero phase and strength difference signals that would be generated by the first antenna pair. The sensor system could determine that the first antenna pair is aligned perpendicular to the arrival direction of the signal, but there are two possible yaw orientations 180 degrees apart that satisfy that condition, and it would not be possible to determine which of those orientations is the true yaw orientation based only on the first antenna pair. However, in accordance with the present invention, the second antenna pair in this scenario provides a non-zero difference signal based on the strengths of the signals arriving at each antenna, and the sense of that difference is positive in one of the two possible yaw orientations and is negative in the other possible yaw orientation. Thus, the true yaw orientation of the satellite can be determined based on the information provided by both antenna pairs.

In a preferred embodiment of the invention, the satellite orientation about all three axes is determined by combining the antenna sensor system with an optical sensor arrangement that is operable to map a view of the celestial body onto at least one focal plane array and to determine orientations of the satellite about two body axes (e.g., the pitch and roll axes) thereof based on a location of a centroid of the earth or other celestial body relative to a center of the focal plane array. The optical sensor arrangement can be one such as described in commonly assigned U.S. patent application Ser. No. 09/756,395, filed Jan. 8, 2001, and entitled "Method and Sensor for Capturing Rate and Position and Stabilization of a Satellite Using At Least One Focal Plane", the disclosure of which is hereby incorporated herein by reference.

Preferably, the antennas of the sensor system have directional sensitivity patterns such that the strength of the signal produced by each antenna is a function of the direction in which the received signal arrives at the antenna. In a preferred embodiment, the antennas of each pair are oriented such that minimum sensitivity occurs when signals arrive in the direction along which the two antennas are spaced apart and maximum sensitivity occurs when the signal arrives perpendicular to this direction. Preferably, one pair is spaced apart along the roll axis of the satellite and the other pair is spaced apart along the pitch axis.

The antennas are preferably mounted such that they all lie substantially in the same plane, which is normal to the yaw axis. This arrangement ensures that the difference signals are substantially unaffected by pitch and roll movements of the satellite.

The two pairs of antennas can comprise four antennas. Alternatively, however, one pair can comprise first and second antennas, and the other pair can comprise one of the first and second antennas together with a third antenna.

The sensor system can receive signals from more than one satellite in orbits in substantially the same orbital plane as the first satellite. For example, the first satellite can be one of a constellation of GPS satellites. The first satellite can receive signals from a satellite located ahead of the first satellite and from another satellite located behind the first satellite in orbit. An independent yaw orientation determination can be made based on each satellite's signal, thus providing redundancy and improving reliability of the yaw determination.

BRIEF DESCRIPTION OF THE DRAWINGS

The above and other objects, features, and advantages of the invention will become more apparent from the following description of certain preferred embodiments thereof, when taken in conjunction with the accompanying drawings in which:

FIG. 3 is a diagrammatic view showing the system of antennas rotated about the yaw axis and receiving signals from a satellite;

FIG. 3A is a view similar to FIG. 3, wherein the antennas have been rotated 90 degrees counterclockwise relative to FIG. 3;

FIG. 3B is a view similar to FIG. 3, wherein the antennas have been rotated 180 degrees counterclockwise relative to FIG. 3;

FIG. 3C is a view similar to FIG. 3, wherein the antennas have been rotated 270 degrees counterclockwise relative to FIG. 3;

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
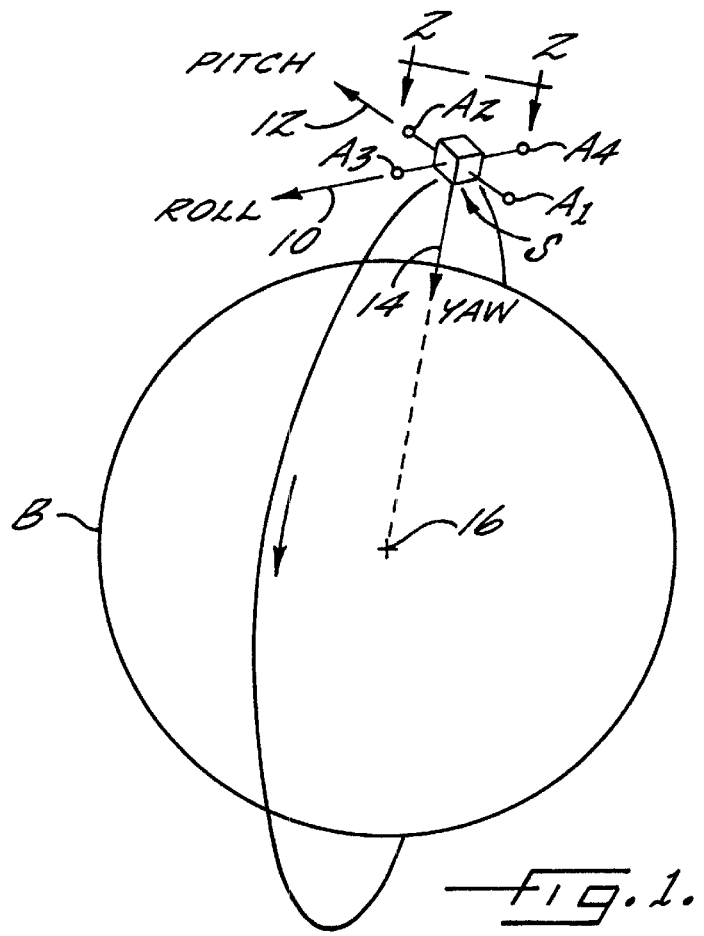
FIG. 1 is a diagrammatic perspective view of a satellite in orbit about a celestial body and having an antenna sensor system in accordance with the present invention.

FIG. 1 diagrammatically depicts a satellite S in orbit about a celestial body B such as earth. The satellite in this illustrative example has a roll axis 10, a pitch axis 12, and a yaw axis 14 that comprise a mutually orthogonal set of body axes. The satellite is oriented with its yaw axis 14 pointing substantially toward the centroid 16 of the celestial body. In many such satellites in earth orbit, yaw steering is performed whereby the satellite is intentionally rotated about its yaw axis in order, for example, to maintain a desired relationship between orientation of solar panels 18 (FIG. 2) of the satellite and the direction of radiation from the sun. The amount of yaw rotation that occurs in a complete orbit of earth depends on the angle between the solar radiation direction and the orbital plane of the satellite, but it can be as great as 180 degrees in some cases. For various reasons, it is important to know with considerable accuracy the yaw orientation of the satellite.

Figure 2:
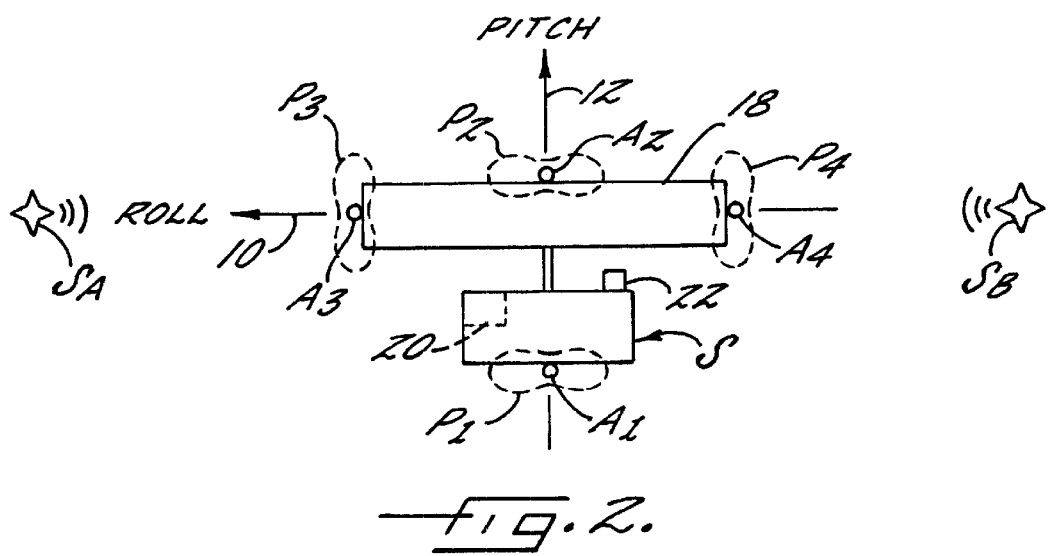
FIG. 2 is a view of the satellite of FIG. 1 in the direction denoted by line 2—2, i.e., viewed along the yaw axis, and showing signals being transmitted by other satellites ahead of and behind the satellite.

In accordance with the present invention, the yaw orientation is determined with a system of antennas for receiving signals from one or more other satellites that are also in orbit about the celestial body, and preferably are in the same orbital plane as the satellite S. With reference to FIG. 2, a view of the satellite S along the yaw axis (i.e., toward the centroid of the celestial body) is shown. Also shown are a satellite $S_A$ ahead of the satellite S in the same orbit, and a satellite $S_B$ behind the satellite S in the same orbit. The satellites $S_A$ and $S_B$ transmit signals on a substantially continuous basis. As an example, the satellites $S_A$ and $S_B$ can be GPS satellites forming a constellation of satellites along with the satellite S. Such satellites typically transmit a signal at a known wavelength, for example, about 24.4 cm.

The satellite S has a plurality of antennas A1, A2, A3, and A4 mounted thereon for receiving the signals from the other satellites $S_A$ and $S_B$. The antennas are arranged in pairs. A first pair of antennas A1 and A2 are spaced apart along the pitch axis 12 of the satellite. A second pair of antennas A3 and A4 are spaced apart along the roll axis 10 of the satellite. The antennas are connected with a processing unit 20 aboard the satellite.

The processing unit 20 is operable to derive difference signals for each pair of antennas, and to deduce the yaw orientation of the satellite S based on the difference signals. With reference to FIG. 3, the pair of antennas A1 and A2 are shown in a yaw orientation rotated clockwise about 45 degrees relative to the orientation shown in FIG. 2. The antennas are shown receiving signals from the satellite $S_A$ ahead of the satellite on which the antennas are mounted. It will be appreciated that in the orientation shown in FIG. 3, the distance from the satellite $S_A$ to the second antenna A2 exceeds that from the satellite $S_A$ to the first antenna A1, the difference in distance being denoted d in FIG. 3. The difference d is geometrically related to the angle θ by which the axis extending between the antennas is rotated relative to the orientation in which the antennas are equidistant from the transmitting satellite, and to the spacing distance L between the antennas, which is known. Thus, if the distance d can be determined, then the magnitude of the angle θ can be easily calculated, and hence the magnitude of the yaw orientation of the satellite can be determined, since the orientation of the axis between the two antennas relative to the body axes of the satellite is known. In accordance with the invention, the distance d is determined by deriving a phase angle difference between the signal received by the first antenna A1 and that received by the second antenna A2. Where the maximum distance d that can occur, which is equal to the antenna spacing L, is equal to or less than the wavelength of the signal being received, it is possible to deduce the distance d based solely on the phase angle difference at the two antennas for any possible orientation of the antenna pair. Where the distance d is greater than one wavelength, however, the phase angle difference can indicate only the fractional part of one wavelength, and additional information is needed to deduce the number of whole wavelengths represented by the distance d. Such additional information can be provided, for example, by a chirp or frequency shift imposed periodically on the transmitted signal, as known in the art.

Thus, the phase difference between the two antennas A1 and A2 can be used to deduce the magnitude of the distance d. However, the phase difference by itself cannot be used to determine the true yaw orientation of the satellite. In fact, the phase difference from the first antenna pair A1, A2 at best can be used to narrow down the possible yaw orientations of the satellite to four different possibilities diagrammatically shown in FIGS. 3, 3A, 3B, and 3C, all of which would yield the same phase angle difference. To determine which of these possibilities is the true yaw orientation, other information is needed.

The yaw orientation history of the satellite can supply the needed additional information to uniquely determine the current yaw orientation of the satellite. That is, if the yaw orientation is periodically determined starting from a known orientation, and if the period between yaw determinations is relatively short in relation to the maximum expected yaw rate of the satellite, then it will generally be clear which direction the satellite has progressed in yaw rotation from one determination to the next. In this situation, the phase angle difference from a single pair of antennas can be used for deducing the yaw orientation.

However, if a computer upset occurs such that the yaw orientation history is lost, it will be appreciated that the phase angle difference from a single pair of antennas cannot provide sufficient information to uniquely determine the yaw orientation, as explained above. Thus, some other piece of information is needed to confirm which of the several possible yaw orientations is the correct one. The four possible yaw orientations shown in FIGS. 3, 3A, 3B, and 3C can be narrowed down to two possibilities by deriving a difference signal based on the strengths of the signals received by the first antenna pair A1, A2, so as to determine which of the two antennas is closer to the transmitting satellite $S_A$. Thus, if the first antenna A1 has the stronger signal, then it can be deduced that either the orientation in FIG. 3 applies, or the orientation in FIG. 3C applies. However, the strength difference cannot indicate which of these two possibilities is correct.

In accordance with the invention, the additional information required to resolve the ambiguity is provided by the second pair of antennas A3, A4. More particularly, a phase angle difference and a signal strength difference are generated based on the signals received at the two antennas A3 and A4. If the antenna A3 has the stronger signal, then it can be deduced that the orientation in FIG. 3 is the correct one of the two possible orientations indicated by the phase angle and strength differences of the first antenna pair A1, A2. Conversely, if antenna A4 has the stronger signal, then the orientation of FIG. 3C is the correct one.

Figure 4:
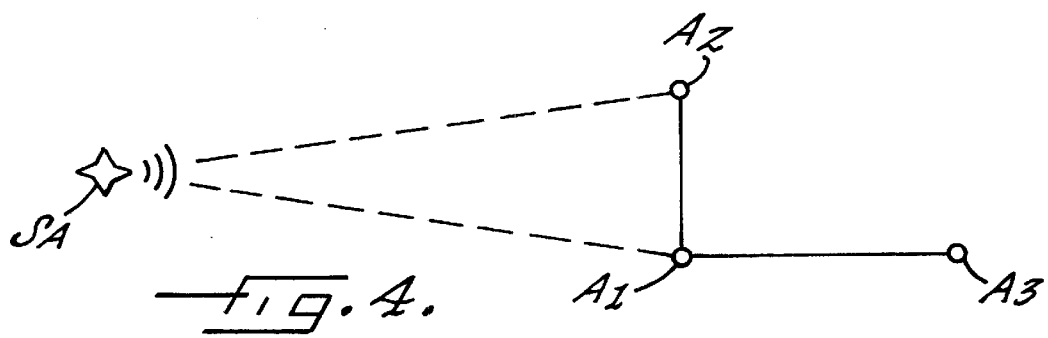
FIG. 4 is a diagrammatic view of an antenna system in accordance with an alternative embodiment of the invention.

Thus, it will be appreciated that by deriving phase angle and signal strength differences from each pair of antennas, the true yaw orientation of the satellite can be uniquely determined. It should be noted that although four antennas are shown and described above for providing this phase angle and strength difference information, it is also possible to produce such information with only three antennas. In this case, two of the antennas A1 and A2 are spaced apart along one direction on the satellite, and the third antenna A3 and one of the other two are spaced apart along a second direction of the satellite, as shown for instance in FIG. 4. The pair A1, A2 are used to produce one set of phase angle and signal strength differences, and the pair A1, A3 are used to produce a second set of phase angle and signal strength differences. In other respects, the determination of yaw orientation is similar to that described above.

Preferably, each antenna of the system has a directional sensitivity pattern P1, P2, P3, P4, such as shown in FIG. 2. In a preferred embodiment of the invention, each antenna pair is mounted such that each antenna has minimum reception when the received signal arrives along the direction in which the two antennas are spaced and maximum reception when the signal arrives perpendicular to such direction, as in FIG. 2. Alternatively, the antennas can be mounted such that maximum reception occurs when the signal arrives in the spacing direction and minimum reception occurs when the signal arrives perpendicular to the spacing direction. It is possible to deduce an approximate heading from a given one of the directional antennas to the transmitting satellite based on signal strength received by the antenna and a correlation of received signal strength versus angle for the antenna. If desired, such a determination can be used to supplement the yaw orientation derived from the phase angle and signal strength differencing as described above.

The antenna system in accordance with the invention can also receive signals from one or more other satellites, such as the satellite $S_B$ behind the satellite S in FIG. 2. A yaw orientation can be deduced based on the signal from each satellite, thus providing redundancy in the determination, which can improve confidence in the solution and enhance reliability in the event of an outage of a transmitting satellite.

Preferably, the processor 20 updates the yaw orientation of the satellite a plurality of times per second. Depending on the stability of the particular satellite, the frequency of the update can be relatively low or relatively high. For instance, for a stable satellite, it would likely be sufficient to update the yaw orientation about 10 times per second. On the other hand, if it is desired to provide performance similar to or exceeding conventional gyros used for determining yaw orientation, it may be desirable to update the yaw orientation as many as 120 times per second.

Where there is a reasonably high degree of confidence in the yaw orientation calculation, it is possible to use a single calculation of yaw orientation as the updated yaw orientation of the satellite. However, if the confidence level is lower (e.g., if there is a substantial amount of noise in the signals), it is preferable to perform time averaging of a plurality of successively calculated yaw orientations, and to use the time-averaged value for controlling the satellite. For instance, from 2 to about 16 calculations can be averaged. Still larger numbers of calculations can be used for the average, but the longer the period of time over which averaging is performed, the fewer times per second the yaw orientation can be updated. Beyond a certain point, averaging over a longer time period may only very slightly improve the accuracy of the calculation while slowing the response time. Thus, it is generally desirable to use the shortest time period for averaging that provides sufficient accuracy.

The orientation of the satellite S about each of the pitch and roll axes could be determined in a manner analogous to that described above for the yaw orientation, by providing a sufficient number of pairs of antennas spaced apart on the satellite in the appropriate directions. In the case of a yaw-steered satellite, however, once the satellite is stabilized in its proper orientation with the yaw axis of the satellite pointing toward the centroid of the celestial body about which the satellite orbits, the ranges of pitch and roll movements of the satellite are generally small. In this case, a preferred embodiment of the invention employs an optical sensor system for determining the pitch and roll orientations.

Figure 5:
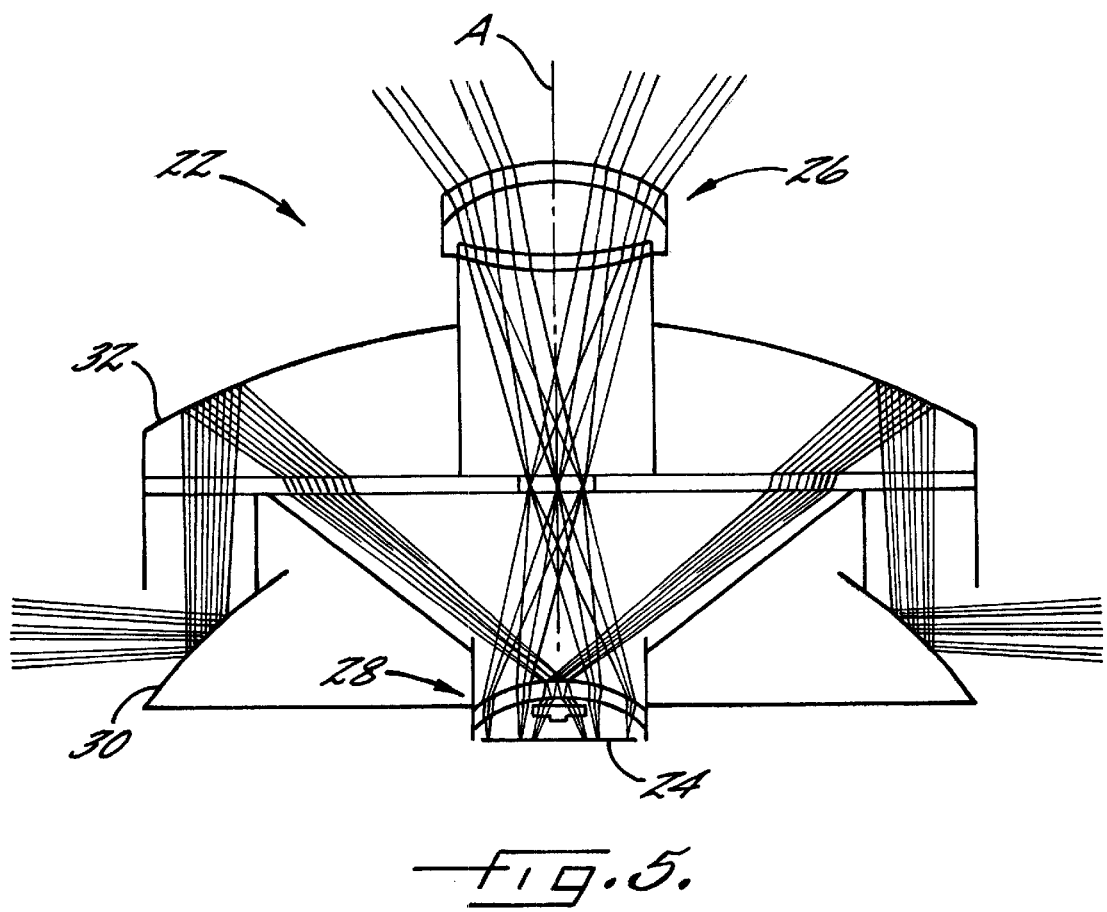
FIG. 5 is a schematic view of an optical sensor for determining pitch and roll orientations of the satellite in accordance with another embodiment of the invention.

More particularly, the satellite can include an optical sensor 22 (FIG. 2) as described in U.S. patent application Ser. No. 09/756,395 one embodiment of which is shown schematically in FIG. 5. The sensor includes a focal plane array 24 and optics 26, 28 for directing radiant energy from an annular field of view looking generally along the optical axis A of the sensor onto an annular region of the focal plane array. As described in the '395 application, the location of the limb of the earth or other celestial body in view of the sensor on the focal plane array is determined and the location of the centroid of the celestial body is determined. Based on the relative locations of the centroid of the celestial body and the center of the focal plane array, the pitch and roll orientations can be derived. It should be noted that the center of the focal plane array does not have to actually lie on a focal plane. For instance, a plurality of focal planes can be arranged in a ring or annular configuration such that the center of the focal plane array is not occupied by any focal plane. However, in the illustrated embodiment, the center of the focal plane array lies on the focal plane 24.

The sensor 22 also includes optics 30, 32 for directing radiant energy from a 360-degree panoramic field of view about the optical axis onto another annular region of the focal plane array 24, which is used for capturing rate of rotation about all three axes of the satellite. Alternatively, the sensor can omit the second set of optics providing the second field of view. For instance, the sensor can be a sensor such as described in any of U.S. Pat. Nos. 5,502,309, 5,534,697, 5,627,675, 5,841,589, and 6,072,524, all of which are incorporated herein by reference.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for determining orientation of a first satellite orbiting a celestial body, comprising:

using at least one optical sensor mounted on the first satellite to map a view of the celestial body onto at least one focal plane array, and determining orientations of the first satellite about pitch and roll axes thereof based on a location of a centroid of the celestial body relative to a center of the at least one focal plane array; and determining an orientation of the first satellite about a yaw axis thereof that points generally toward the celestial body's centroid by:

receiving a signal from a second satellite, the signal being received at the first satellite by each of a first pair of antennas that are spaced apart along a first direction having a component parallel to one of the pitch and roll axes and by each of a second pair of antennas that are spaced apart along a second direction having a component parallel to the other of the pitch and roll axes; and determining the orientation of the first satellite about the yaw axis based on a first difference signal derived by comparing received signals of the antennas of the first pair and based on a second difference signal derived by comparing received signals of the antennas of the second pair.

2. The method of claim 1, wherein the difference signal for one pair of antennas is derived based on a difference in phase of the received signals, and the difference signal for the other pair of antennas is derived based on a difference in signal strength of the received signals.

3. The method of claim 1, wherein each antenna has a directional sensitivity pattern, each pair of antennas is used to derive a phase angle difference and a signal strength difference of the received signals, and the yaw orientation of the satellite is determined based on the phase angle difference and signal strength difference of each pair of antennas.

4. The method of claim 3, wherein the antennas making up the first pair are spaced apart along the roll axis and have directional sensitivity patterns arranged such that maximum sensitivity occurs when signals arrive along a direction parallel to the pitch axis and minimum sensitivity occurs when signals arrive along a direction parallel to the roll axis.

5. The method of claim 4, wherein the antennas making up the second pair are spaced apart along the pitch axis and have directional sensitivity patterns arranged such that maximum sensitivity occurs when signals arrive along a direction parallel to the roll axis and minimum sensitivity occurs when signals arrive along a direction parallel to the pitch axis.

6. The method of claim 1, wherein the first pair of antennas comprises first and second antennas and the second pair of antennas comprises one of the first and second antennas and a third antenna.

7. The method of claim 1, wherein the first pair of antennas comprises first and second antennas and the second pair of antennas comprises third and fourth antennas.

8. The method of claim 1, wherein all of the antennas making up the first and second pairs are mounted on the satellite such that the antennas lie substantially in a common plane normal to the yaw axis.

9. The method of claim 1, further comprising receiving a signal from a third satellite, the second and third satellites each being in an orbit that defines an orbital plane substantially the same as that of the first satellite, and deducing a yaw orientation of the first satellite based on the signal from the second satellite and another yaw orientation of the first satellite based on the signal from the third satellite.

10. The method of claim 1, wherein the yaw orientation is calculated at each of a plurality of successive times.

11. The method of claim 10, wherein the yaw orientation calculation is performed between about 10 and 120 times per second, and wherein a time-averaged yaw orientation is calculated based on a plurality of successive calculations of yaw orientation.

12. A method for determining an orientation of a first satellite about a yaw axis thereof that points generally toward a centroid of a celestial body about which the first satellite is in orbit, the method comprising:
  receiving a signal from a second satellite, the signal being received at the first satellite by each of a first pair of antennas that are spaced apart along a first direction leaving a component parallel to one of the pitch and roll axes and by each of a second pair of antennas that are spaced apart along a second direction having a component parallel to the other of the pith and roll axes; and
  determining the orientation of the first satellite about the yaw axis based on a first difference signal derived by comparing received signals of the antennas of the first pair and based on a second difference signal derived by comparing received signals of the antennas of the second pair, wherein the difference signal for one pair of antennas is derived based on a difference in phase of the received signals, and the difference signal for the other pair of antennas is derived based on a difference in signal strength of the received signals.

13. The method of claim 12, wherein each antenna has a directional sensitivity pattern, each pair of antennas is used to derive a phase angle difference and a signal strength difference of the received signals, and the yaw orientation of die satellite is determined based on the phase angle difference and signal strength difference of each pair of antennas.

14. The method of claim 13, wherein the antennas making up the first pair are spaced apart along the roll axis and have directional sensitivity patterns arranged such that maximum sensitivity occurs when signals arrive along a direction parallel to the pitch axis and minimum sensitivity occurs when signals arrive along a direction parallel to the roll axis.

15. The method of claim 14, wherein the antennas making up the second pair are spaced apart along the pitch axis and have directional sensitivity patterns arranged such that maximum sensitivity occurs when signals arrive along a direction parallel to the roll axis and minimum sensitivity occurs when signals arrive along a direction parallel to the pitch axis.

16. The method of claim 12, wherein the first pair of antennas comprises first and second antennas and the second pair of antennas comprises one of the first and second antennas and a third antenna.

17. The method of claim 12, wherein the first pair of antennas comprises first and second antennas and the second pair of antennas comprises third and fourth antennas.

18. The method of claim 12, wherein all of the antennas making up the first and second pairs are mounted on the satellite such that the antennas lie substantially in a common plane normal to the yaw axis.

19. The method of claim 12, further comprising receiving a signal from a third satellite, the second and third satellites each being in an orbit that defines an orbital plane substantially the same as that of the first satellite, and deducing a yaw orientation of the first satellite based on the signal from the second satellite and another yaw orientation of the first satellite based on the signal from the third satellite.

20. The method of claim 12, wherein the yaw orientation is calculated at each of a plurality of successive times.

21. The method of claim 20, wherein the yaw orientation calculation is performed between about 10 and 120 times per second, and wherein a time-averaged yaw orientation is calculated based on a plurality of successive calculations of yaw orientation.

22. A sensor system for determining yaw orientation of a satellite in orbit about a celestial body, comprising:
  a first pair of antennas mounted on the satellite such that the antennas are spaced apart along a first body axis of the satellite, and a second pair of antennas mounted on the satellite such that the antennas are spaced apart along a second body axis of the satellite, the first and second body axes being generally orthogonal to a third body axis of the satellite comprising a yaw axis that points toward a centroid of the celestial body when the satellite is properly oriented, each pair of antennas being operable to receive signals from a second satellite in an orbit defining an orbital plane substantially the same as that of the first satellite, and each antenna has a directional sensitivity pattern oriented in a predetermined manner relative to the first satellite;
  a processing unit connected with the antennas and operable to derive a phase angle difference and a signal strength difference of the received signals for each pair of antennas and to determine the yaw orientation of the satellite based on the phase angle difference and signal strength difference of each pair of antennas, the processing unit being programmed with information correlating the first and second difference signals with yaw orientation of the first satellite about the yaw axis, and being operable to determine the yaw orientation based on said information and the difference signals.

23. The sensor system of claim 22, wherein the antennas making up the first pair have directional sensitivity patterns arranged such that maximum sensitivity occurs when signals arrive along a direction parallel to the second body axis and minimum sensitivity occurs when signals arrive along a direction parallel to the first body axis.

24. The sensor system of claim 23, wherein the antennas making up the second pair have directional sensitivity patterns arranged such that maximum sensitivity occurs when signals arrive along a direction parallel to the first body axis and minimum sensitivity occurs when signals arrive along a direction parallel to the second body axis.

25. The sensor system of claim 22, wherein the first pair of antennas comprises first and second antennas and the second pair of antennas comprises one of the first and second antennas and a third antenna.

26. The sensor system of claim 22, wherein all of the antennas making up the first and second pairs are mounted on the satellite such that the antennas lie substantially in a common plane normal to the yaw axis.

27. The sensor system of claim 22, further comprising an optical sensor arrangement operable to map a view of the celestial body onto at least one focal plane array and to determine orientations of the first satellite about the first and second body axes thereof based on a location of a centroid of the celestial body relative to a center of the at least one focal plane array.

* * * * *

UNITED STATES PATENT AND TRADEMARK OFFICE
CERTIFICATE OF CORRECTION

PATENT NO.    : 6,501,419 B2
DATED         : December 31, 2002
INVENTOR(S)   : Davis et al.

It is certified that error appears in the above-identified patent and that said Letters Patent is hereby corrected as shown below:

Column 9,
Line 44, "leaving" should read -- having --;
Line 47, "pith" should read -- pitch --;
Line 62, "die" should read -- the --.

Signed and Sealed this

Twenty-fifth Day of March, 2003

JAMES E. ROGAN
*Director of the United States Patent and Trademark Office*